(12) United States Patent
Walter et al.

(10) Patent No.: US 8,215,602 B2
(45) Date of Patent: Jul. 10, 2012

(54) LONGITUDINAL ADJUSTMENT APPARATUS FOR A VEHICLE SEAT

(75) Inventors: Klaus Walter, Paderborn (DE); Joerg Sternberg, Rheda-Wiedenbru (DE); Andre Schebaum, Steinhagen (DE); Marc Laumeier, Langenberg (DE); Michael Wojatzki, Ennigerloh (DE); Hans-Peter Mischer, Bad Meinberg (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/154,676

(22) Filed: May 23, 2008

(65) Prior Publication Data

US 2009/0289485 A1    Nov. 26, 2009

(51) Int. Cl.
*F16M 13/00* (2006.01)
(52) U.S. Cl. ...................... 248/424; 248/429; 296/65.13
(58) Field of Classification Search .................. 248/424, 248/429
See application file for complete search history.

(56) References Cited

U.S. PATENT DOCUMENTS

| | | | |
|---|---|---|---|
| 5,167,393 A | 12/1992 | Hayakawa et al. |
| 5,772,173 A | 6/1998 | Couasnon |
| 5,806,825 A | 9/1998 | Couasnon |
| 5,813,648 A | 9/1998 | Moradell et al. |
| 5,931,436 A | 8/1999 | Rohee |
| 6,079,688 A | 6/2000 | Levillain et al. |
| 6,113,051 A | 9/2000 | Moradell et al. |
| 6,227,596 B1 | 5/2001 | Foucault et al. |
| 6,322,035 B1 | 11/2001 | D'Amtimo et al. |
| 6,322,036 B1 | 11/2001 | Tame et al. |
| 6,349,914 B1 | 2/2002 | Yoshida et al. |
| 6,354,553 B1 | 3/2002 | Lagerweij et al. |
| 6,505,805 B2 | 1/2003 | Fuller |
| 6,572,066 B1 | 6/2003 | Paisley et al. |
| 6,637,712 B1 | 10/2003 | Lagerweij |
| 6,641,104 B2 | 11/2003 | Flick |
| 6,648,292 B2 | 11/2003 | Flick et al. |
| 6,669,284 B2 | 12/2003 | Feichtinger et al. |
| 6,688,574 B2 | 2/2004 | Okazaki et al. |
| 6,843,532 B2 | 1/2005 | Borbe et al. |
| 6,869,057 B2 | 3/2005 | Matsumoto et al. |
| 6,902,235 B2 | 6/2005 | Rohee et al. |
| 6,923,415 B2 | 8/2005 | Yokoi et al. |
| 6,981,681 B2 | 1/2006 | Matsumoto |
| 7,025,319 B2 | 4/2006 | Willems et al. |
| 7,066,521 B2 | 6/2006 | Jung et al. |
| 7,097,250 B2 | 8/2006 | Rausch et al. |
| 7,147,195 B2 | 12/2006 | Danjo et al. |
| 7,150,441 B2 | 12/2006 | Leguede et al. |
| 7,293,752 B2 | 11/2007 | McCulloch et al. |
| 7,328,877 B2 | 2/2008 | Yamada et al. |
| 7,331,558 B2 | 2/2008 | Jeong |
| 7,431,256 B2 | 10/2008 | Yamada et al. |
| 7,523,913 B2 | 4/2009 | Mizuno et al. |
| 2004/0026975 A1 | 2/2004 | Rausch et al. |
| 2007/0090260 A1 | 4/2007 | Kojima |
| 2007/0090263 A1 | 4/2007 | Yamada et al. |
| 2007/0176072 A1 | 8/2007 | Ikegaya et al. |
| 2008/0231101 A1 | 9/2008 | Sakakibara et al. |
| 2009/0114793 A1 | 5/2009 | Brewer et al. |

*Primary Examiner* — Nkeisha Smith
(74) *Attorney, Agent, or Firm* — MacMillan, Sobanski & Todd, LLC

(57) ABSTRACT

A longitudinal seat adjustment apparatus for a vehicle seat includes a first seat support member that is attachable to a vehicle. A second seat support member that is movable with respect to the first seat support member and configured to support the seat such that the seat is movable with the second seat support member is also provided. A locking member that is movable generally vertically with respect to the first and second seat support members between a locked position and an unlocked position for locking and unlocking the second seat support member with respect to the first seat support member is additionally provided. The locking member is a substantially planar two-part locking member and includes a first part generally horizontally movable with respect to a second part.

20 Claims, 4 Drawing Sheets

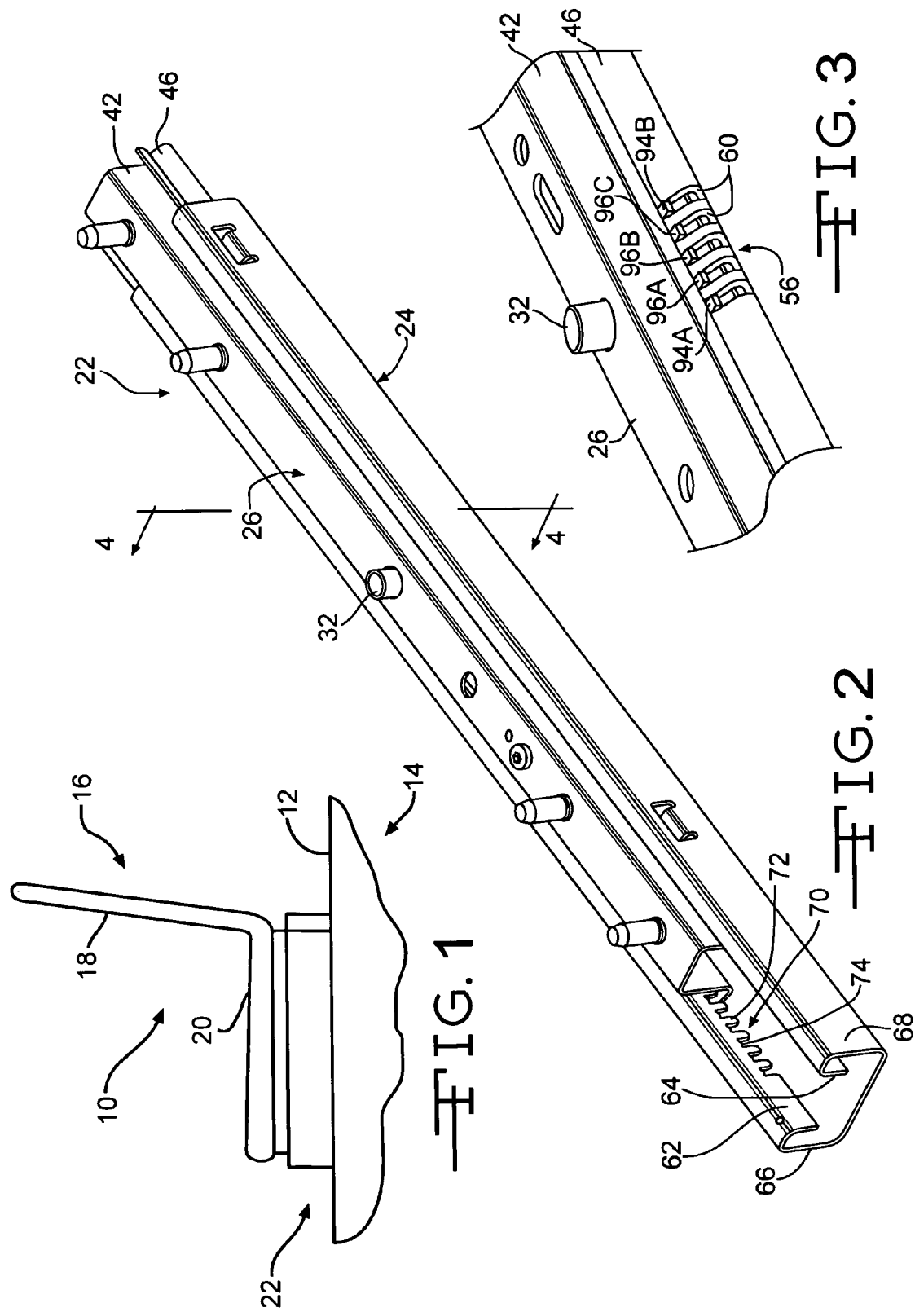

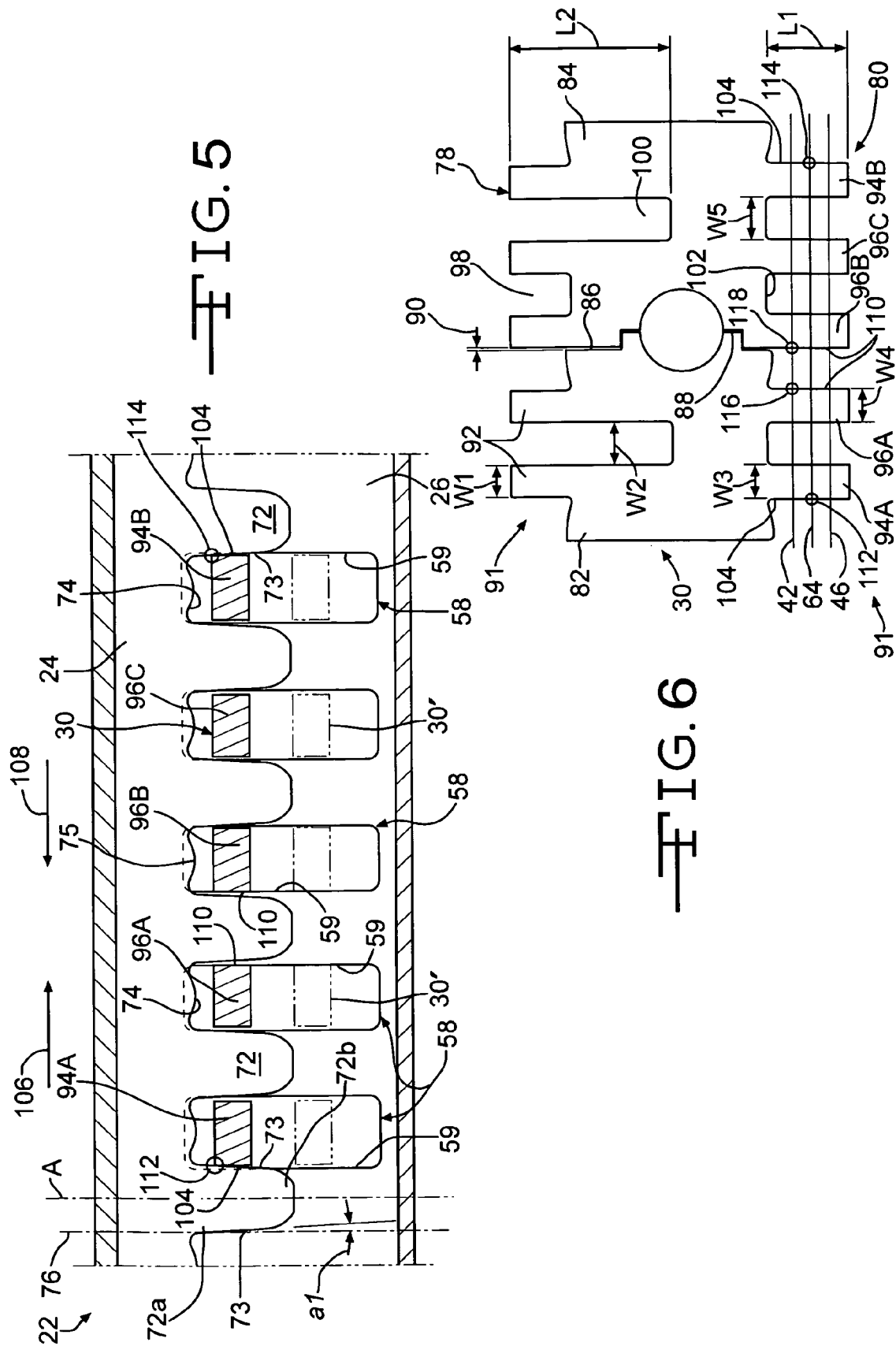

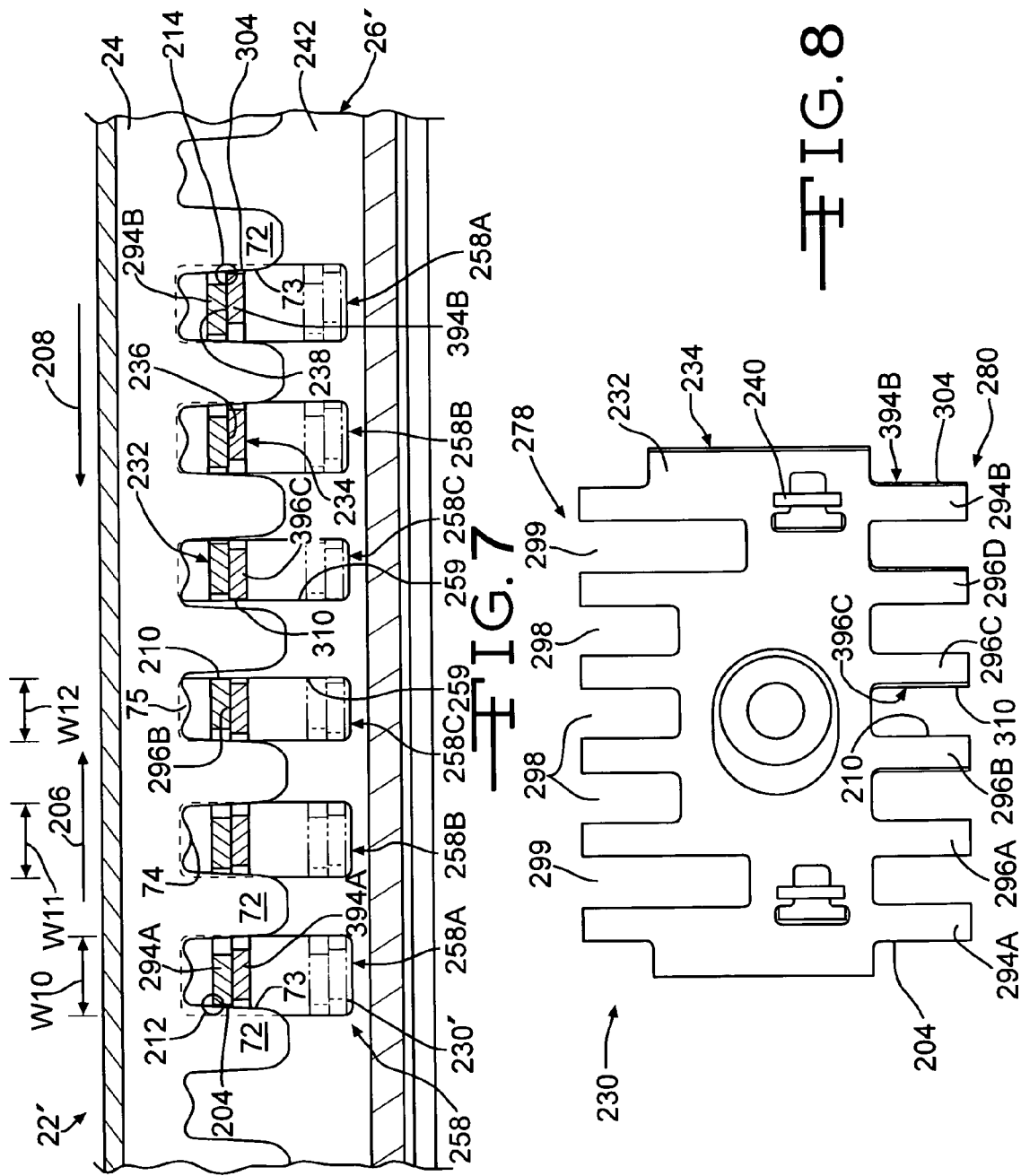

LONGITUDINAL ADJUSTMENT APPARATUS FOR A VEHICLE SEAT

BACKGROUND

Various embodiments of a seat assembly are described herein. In particular, the embodiments described herein relate to an improved longitudinal adjustment apparatus for a vehicle seat.

A vehicle seat assembly may include a seat supported on a longitudinal adjustment apparatus that enables the seat to be positioned in multiple longitudinal positions. U.S. Pat. Nos. 6,113,051 and 6,648,292 disclose examples of such an apparatus.

U.S. Pat. No. 6,641,104 discloses another example of a longitudinal adjustment apparatus for a vehicle seat. The apparatus includes an upper rail 11, a lower rail 12, and a locking plate 21. The locking plate 21 must execute an angular movement, or tilt in the longitudinal direction, to reach a locked position (wherein the upper and lower rails are held in a position without play). As shown in FIG. 4, the locking plate 21 tilts longitudinally, because the penetration depth in the wedge-shaped opening 16' is different from that of the tooth 15' in the slot 14. Thus, in the locked position, one longitudinal end of the locking plate 21 is horizontally higher that the other longitudinal end of the locking plate 21.

SUMMARY

The present application describes various embodiments of a longitudinal seat adjustment apparatus for a vehicle seat. One embodiment of the longitudinal seat adjustment apparatus includes a first seat support member that is attachable to a vehicle. A second seat support member that is movable with respect to the first seat support member and configured to support the seat such that the seat is movable with the second seat support member is also provided. A locking member that is movable generally vertically with respect to the first and second seat support members between a locked position and an unlocked position for locking and unlocking the second seat support member with respect to the first seat support member is additionally provided. The locking member is a substantially planar two-part locking member and includes a first part generally horizontally movable with respect to a second part.

Other advantages of the longitudinal seat adjustment apparatus will become apparent to those skilled in the art from the following detailed description, when read in light of the accompanying drawings.

BRIEF DESCRIPTION OF THE DRAWINGS

FIG. 1 is a schematic plan view of a vehicle seat assembly having a first embodiment of the longitudinal seat adjustment apparatus.

FIG. 2 is a perspective view of the first embodiment of the longitudinal seat adjustment apparatus illustrated in FIG. 1.

FIG. 3 is an enlarged perspective view of a first embodiment of the upper rail illustrated in FIGS. 1 and 2.

FIG. 5 is an enlarged cross sectional view of a portion of the first embodiment of the longitudinal seat adjustment apparatus taken along the line 5-5 in FIG. 4.

FIG. 6 is a top plan view of a first embodiment of the locking member illustrated in FIGS. 1 through 5, having a portion of the upper and lower rails illustrated schematically.

FIG. 7 is an enlarged cross sectional view of a portion of a second embodiment of the longitudinal seat adjustment apparatus illustrated in FIG. 2.

FIG. 8 is a top plan view of a second embodiment of the locking member illustrated in FIG. 7.

DETAILED DESCRIPTION

Figure 4:
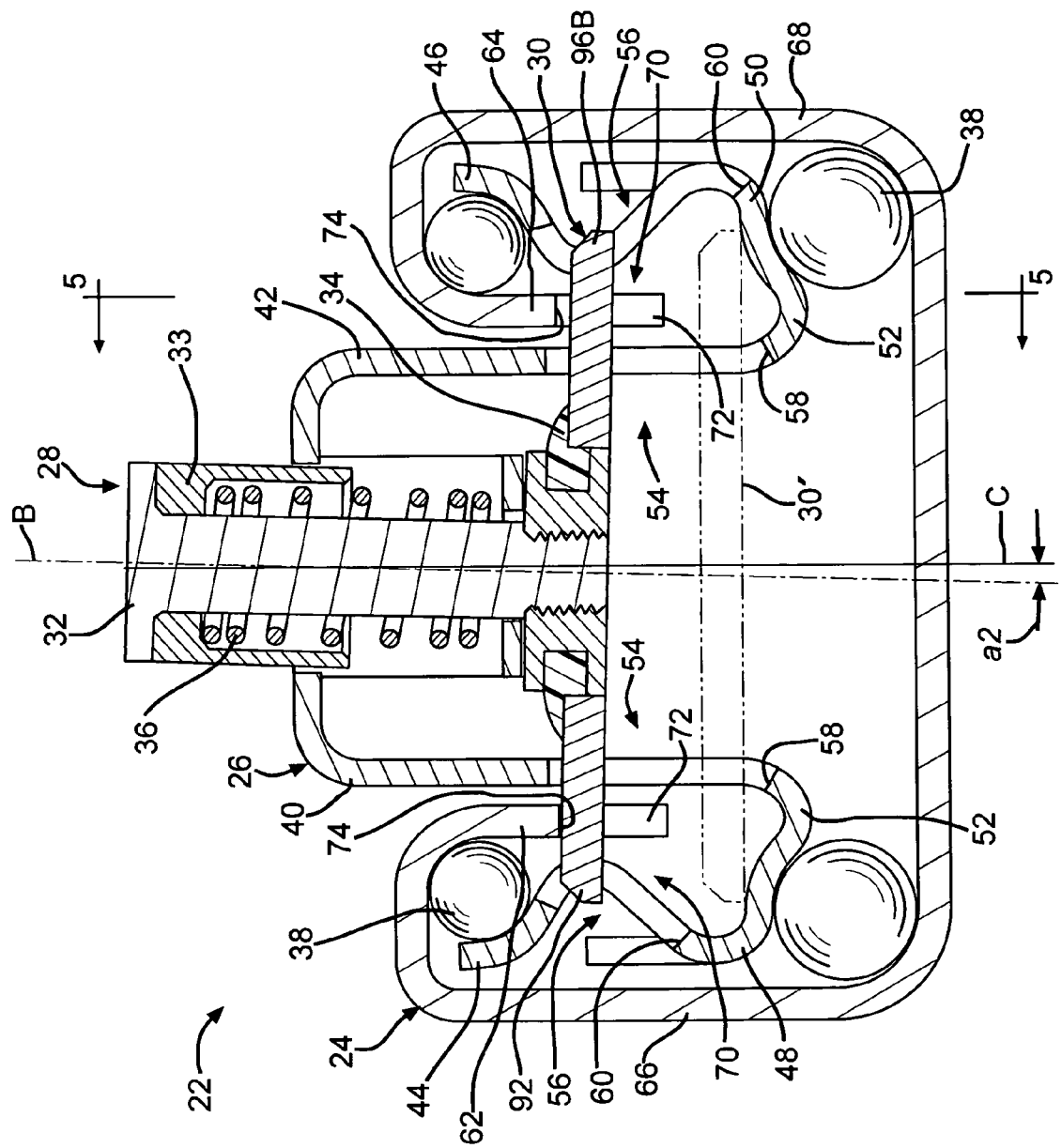
FIG. 4 is an enlarged cross sectional view of the first embodiment of the longitudinal seat adjustment apparatus taken along the line 4-4 in FIG. 2.

Referring now to the drawings, there is illustrated in FIG. 1 a vehicle seat assembly indicated generally at 10. The illustrated vehicle seat assembly 10 in mounted on a floor 12 of a vehicle 14. The seat assembly 10 includes a vehicle seat 16 having a seat back 18 that may be movably attached, such as pivotally attached, or fixedly attached to a seat bottom 20. The assembly 10 further includes a longitudinal seat adjustment apparatus 22 that supports the seat 16 and that is attached to the floor 12 or other portion of the vehicle 14.

The seat adjustment apparatus 22 is structured and configured to allow the seat 16 to be positioned in one or more longitudinal use positions. Referring to FIGS. 2 and 3, the seat adjustment apparatus 22 includes a first seat support member, such as a lower rail 24, that is attachable to the vehicle 14, and a second seat support member, such as an upper rail 26, that is attached to the seat bottom 20 and movable longitudinally with respect to the lower rail 24. Although only one set of support members is shown in FIG. 2, it will be understood that the seat adjustment apparatus 22 may include any suitable number of support members, such as one set of seat support members on each side of the seat bottom 20.

The seat adjustment apparatus 22 further includes a locking and unlocking device 28 for one of locking and unlocking the seat 16 in one or more use positions, such as multiple incremental use positions. In the embodiment shown in FIG. 4, the locking device 28 includes a first embodiment of a locking member 30 that is supported on the upper rail 26 such that the locking member 30 is movable generally vertically with respect to the rails 24 and 26 between a locked position, shown in FIGS. 4 and 5, and an unlocked position, shown by the phantom line 30' in FIGS. 4 and 5.

If desired, the seat adjustment apparatus 22 may include an external release member, such as a bar or handle (not shown). For example, the release member may be a bar or handle that is pivotally connected to a portion of the vehicle 14 and engages the pin 32, described below.

As best shown in FIG. 4, the locking member 30 may be supported by a support member, such as a pin 32 that extends through the upper rail 26. In the illustrated embodiment, the pin 32 is attached to the locking member 30 by a mounting collar assembly 34. In this embodiment, a helical extension spring 36 is disposed between the locking member 30 and a shoulder 33 of the pin 32, such that the spring 36 urges the locking member 30 upwardly as viewed in FIG. 4. As explained herein below in detail, the locking member 30 is structured and configured to cooperate with one or more lock portions formed in the rails 24 and 26 to lock the upper rail with respect to the lower rail 24 in a desired longitudinal position.

Referring to FIGS. 4 through 6, additional details of the rails 24 and 26 and the locking member 30 will now be described. The upper rail 26 may be structured and configured to slide relative to the lower rail 24 with the assistance of multiple balls or rollers 38 disposed between the rails 24 and 26. Although the rails 24 and 26 may have any suitable construction, the illustrated upper rail 26 includes first and second substantially planar inner walls 40 and 42, respectively, and first and second outer walls 44 and 46, respectively, disposed outwardly of the inner walls 40 and 42. The upper rail 26 further includes a first generally laterally extending portion 48 that extends between the first inner wall 40 and the first outer wall 44. A second generally laterally extending portion 50 extends between the second inner wall 42 and the second outer wall 46. Each portion 48 and 50 includes a bent portion 52 formed beneath a respective inner wall 40 and 42.

Each inner wall 40 and 42 includes a first lock portion 54, and each outer wall 44 and 46 includes a second lock portion 56 that faces a respective first lock portion 54. In the illustrated embodiment, the first lock portion 54 includes a plurality of first openings 58 formed in the associated inner wall 40 and 42, such that each first opening 58 is substantially planar. Additionally, each first opening 58 is substantially located above the associated bent portion 52. As a result, the upper rail 26 may exhibit significant strength. The illustrated first openings 58 are substantially rectangular in shape and include substantially vertical side surfaces 59, although the first openings 58 may have any other desired shape, such as a trapezoidal shape. Although five first openings 58 are shown in the exemplary embodiment illustrated in FIG. 5, the upper rail 26 may have any desired number of first openings 58 formed therein.

In the illustrated embodiment, and as best shown in FIG. 3, the second lock portion 56 includes a plurality of second openings 60 formed in the associated outer wall 44 and 46, and aligned with the first openings 58. In the exemplary embodiment illustrated, five second openings 60 are shown. It will be understood that the number of second openings 60 may equal the number of first openings 58; however, the upper rail 26 may have any desired number of second openings 60 formed therein.

As shown in FIGS. 2 through 4, the lower rail 24 includes first and second substantially planar inner walls 62 and 64, respectively and first and second substantially planar outer walls 66 and 68, respectively. Each inner wall 62 and 64 includes a third lock portion 70 that is located between the first and second lock portions 54 and 56, respectively, of the upper rail 26. In the illustrated embodiment, the third lock portion 70 includes a plurality of downwardly extending (when viewing FIGS. 2 and 4) teeth 72 formed in the associated inner wall 62 and 64. Adjacent teeth 72 define third openings or notches 74 therebetween. In the illustrated embodiment, the notches 74 include a rounded protrusion 75 extending outwardly from an upper surface of the notch 74 (extending downwardly when viewing FIG. 5).

As best shown in FIG. 5, the illustrated teeth 72 have side surfaces 73 and are angled such that a base 72a is wider than a distal end 72b of each tooth 72. In the illustrated embodiment, the tooth 72 has an angle a1 of about 3 degrees from a line 76 parallel to an axis A of the tooth 72. It will be understood however, that the tooth 72 may have any desired angle, such as an angle within the range of from about 1 degree to about 7 degrees.

In the embodiment shown in FIGS. 4 through 6, the locking member 30 is generally planar, has a first longitudinal side 78, a second longitudinal side 80, and includes a first part or portion 82 and a second part or portion 84. A first edge 86 of the first portion 82 is mounted adjacent a first edge 88 of the second portion 84 such that the first portion 82 and the second portion 84 are generally horizontally movable with respect to one another, as will be described in detail below. In the exemplary embodiment illustrated, the pitch between the teeth is the same for all teeth of the locking member 30. Alternatively, the locking member 30 may be structured and configured such that the pitch varies and the locking member has more than one tooth pitch. It will be understood however, that one skilled in the art will be able to determine the appropriate pitch and number of pitches for the locking member 30 through routine experimentation. It will be also understood that in FIG. 6, the inner walls 42 and 64 and the outer wall 46 are illustrated schematically.

The first portion 82 and the second portion 84 are mounted adjacent one other such that the edges 86 and 88 are spaced a distance apart and define a gap 90. In the exemplary embodiment illustrated, the gap is about 0.5 mm wide. It will be understood however, that the gap 90 may have any desired width, such as any width greater than 0 mm. It will be understood that one skilled in the art will be able to determine the appropriate width of the gap 90 through routine experimentation. The gap 90 allows for the generally horizontal movement of the first and second portions 82 and 84 of the locking member 30, as described herein below.

The illustrated locking member 30 has a thickness within the range of about 2.0 mm. In another embodiment, the locking member 30 has a thickness within the range of from about 1.0 mm to about 3.0 mm. It will be understood however, that the locking member 30 may have any other desired thickness, such as for example a thickness smaller than 1.0 mm or larger than 3.0 mm. It will be understood that one skilled in the art will be able to determine the appropriate thickness of the locking member 30 through routine experimentation.

As best shown in FIG. 6, the locking member 30 may include one or more first lock features 91, such as teeth 92, 94A-B, and 96A-C. The illustrated locking member 30 includes five first teeth 92 formed on the first longitudinal side 78. The teeth 92 have a uniform width w1 and define first and second slots 98 and 100, respectively, therebetween. Alternatively, the teeth 92 may have any desired width. For example, the teeth 92 may have a plurality of different widths. It will be further understood that one skilled in the art will be able to determine the appropriate thickness of the teeth 92 through routine experimentation.

The illustrated slots 98 and 100 have a uniform width w2. Alternatively, the slots 98 and 100 may have any desired widths. For example, the slots 98 and 100 on the first longitudinal side 78 of the locking member 30 may have a plurality of different widths. It will be understood that one skilled in the art will be able to determine the appropriate widths of the slots 98 and 100 of the locking member 30 through routine experimentation.

Two second teeth 94A and 94B are formed on the outboard ends of the second longitudinal side 80, and three third teeth 96A, 96B, and 96C are formed between the second teeth 94. The second teeth 94A and 94B have a uniform width w3. The third teeth 96A, 96B, and 96C have side or outboard edges 110 and have a uniform width w4. Alternatively, the teeth 94A-B and 96A-C may have any desired widths. For example, the teeth 94A-B and 96A-C may have a plurality of different widths. It will be further understood that one skilled in the art will be able to determine the appropriate thickness of the teeth 94A-B and 96A-C through routine experimentation.

In the illustrated embodiment, the width w3 of the teeth 94A and 94B is larger than the width w4 of the teeth 96A, 96B, and 96C, and the width w4 of the teeth 96A, 96B, and 96C, is larger than the width w1 of the teeth 92. Third slots 102 are defined between the teeth 94A, 96A, 96B, 96C, and 94B. The illustrated slots 102 have a uniform width w5. Alternatively, the slots 102 may have any desired width. For example, the slots 102 on the second longitudinal side 80 of the locking member 30 may have a plurality of different widths. It will be understood that one skilled in the art will be able to determine the appropriate widths of the slots 102 of the locking member 30 through routine experimentation.

In the illustrated embodiment of the locking member 30, each third slot 102 has a first length L1 and each second slot 100 has a second length L2 that is substantially larger than each first length L1 to facilitate assembly of the locking member 30 on the upper rail 26.

In the illustrated embodiment, the first portion 82 includes two first teeth 92, one second tooth 94A, and one third tooth 96A. The second portion 84 includes three first teeth 92, one second tooth 94B, and two third teeth 96B and 96C. It will be understood however, that the first and second portions 82 and 84, respectively, may be formed with any desired number of teeth.

Referring now to FIGS. 4 and 5, the relative positions of the rails 24 and 26 and the locking member 30 when assembled into the seat adjustment apparatus 22 will now be described. Each of the first teeth 92 on the first longitudinal side 78 extend through a first opening 58 of the first inner wall 40 of the upper rail 26, through a notch 74 in the first inner wall 62 of the lower rail 24, then through the second opening 60 of the first outer wall 44 of the upper rail 26.

Similarly, the second and third teeth 94A, 94B, 96A, 96B, and 96C on the second longitudinal side 80, extend through a first opening 58 of the second inner wall 42 of the upper rail 26, through a notch 74 in the second inner wall 64 of the lower rail 24, then through the second opening 60 of the second outer wall 46 of the upper rail 26.

Advantageously, the seat adjustment apparatus 22 is structured and configured to reduce or eliminate free play. The locking member 30 may be moved from an unlocked position, as shown at 30' in FIG. 4, by actuation of the pin 32 such that the spring 36 urges the locking member 30 into the locked position (upwardly when viewing FIG. 4).

As the locking member 30 moves upwardly, an upper portion of the outboard edge 104 of each tooth 94A and 94B of the locking member 30 frictionally engages the angled side surface 73 of a tooth 72. The extent of the maximum upward travel of the teeth 94A and 94B in the exemplary embodiment illustrated is indicated by the circles labeled 112 and 114, respectively. The angled side surface 73 causes the second tooth 94A of the first portion 82 to move substantially horizontally in the direction of the arrow 106. The angled side surface 73 of the tooth 72 also causes the second tooth 94B of the second portion 84 to move substantially horizontally in the direction of the arrow 108. It will be understood that the first portion 82 and the second portion 84 of the locking member 30 moves upwardly substantially simultaneously.

As the first portion 82 moves horizontally (to the right when viewing FIG. 5), the outboard edge 110 of the third tooth 96A is urged into frictional engagement with a side surface 59 of a first opening 58 of the upper rail 26. As the second portion 84 moves horizontally (to the left when viewing FIG. 5), the outboard edge 110 of the third tooth 96B is also urged into frictional engagement with a side surface 59 of a first opening 58 of the upper rail 26.

In the locked position, the combination of the contact between the locking member 30, the lower rail 24, and the upper rail 26 clinch the second inner wall 64 of the lower rail 24, the second inner wall 42 of the upper rail 26, and the locking member 30 together, and thereby substantially eliminating free-play.

Referring again to FIG. 6, the width w1 of each first tooth 92 of the first longitudinal side 78 of the locking member 30 is smaller than each notch 74 in the first inner wall 62 of the lower rail 24. Accordingly, in the locked position, as best shown in FIG. 4, the teeth 92 are urged upwardly into engagement with the protrusions 75.

Referring again to FIG. 4, as a result of the frictional contact between the teeth 94A and 94B and the teeth 72 (see the circles 112 and 114 in FIGS. 5 and 6), and between the teeth 96A and 96B and the surface 59 of the openings 58 (see the circles 116 and 118 in FIG. 6), the second longitudinal side 80 of the locking member 30 may move upwardly a shorter distance than the first longitudinal side 78. Accordingly, an axis B through the pin 32 may be disposed at an angle a2 from a vertical axis, as represented by the line C. In the illustrated embodiment, the angle a2 is about 2.2 degrees. In another embodiment, the angle a2 may be within the range of from about slightly greater than 0 degrees to about 5.0 degrees. It will be understood however, that the angle a2 may be any other desired angle, and that one skilled in the art will be able to determine the appropriate angle a2 through routine experimentation.

FIGS. 4 and 5 illustrate a first embodiment of the relative positions of the locking member 30, lower rail 24, and upper rail 26 in the locked position. It will be understood however, that the second longitudinal side 80 of the locking member 30 may be disposed relative to the teeth 72 other than as illustrated. For example, the second longitudinal side 80 of the locking member 30 may be disposed with the range of from about 1.0 mm higher to about 1.0 mm lower relative to the teeth 72 than as illustrated in FIGS. 4 and 5.

Referring now to FIGS. 7 and 8, and using like reference numbers to indicate corresponding parts, there is indicated generally at 22' a portion of a second embodiment of the seat adjustment apparatus. The seat adjustment apparatus 22' is substantially identical to the seat adjustment apparatus 22, except that it includes alternate embodiments of an upper rail 26' and a locking member 230.

The illustrated seat adjustment apparatus 22' includes the lower rail 24, the upper rail 26', and the locking member 230. The upper rail 26' is substantially identical to the upper rail 26, except that it includes six first openings 258 formed in the first inner wall (not shown) and the second inner wall 242. The openings 258 include a first openings 258A, second openings 258B, and third openings 258C. Each opening has a side surface. In the illustrated embodiment, a width w10 of the first opening 258A is larger than a width w11 of the second opening 258B, and the width w11 of the second opening 258B is larger that a width w12 of the third opening 258C.

The illustrated locking member 230 is generally planar and includes a first part or upper plate 232 and a second part or lower plate 234, each plate having substantially the same shape. Each plate 232 and 234 has a major face 236 and 238, respectively. As best shown in FIG. 7, the major face 236 of the upper plate 232 is slidingly mounted to the major face 238 of the lower plate 234, such that the plates 232 and 234 are generally horizontally movable with respect to one another. The lower plate 234 may be slidingly mounted to the upper plate by any desired method, such as the mounting pins 240 illustrated in FIG. 8. The illustrated locking member 230 has a thickness of about 2.0 mm, wherein each of the plates 232 and 234 has a thickness of about 1.0 mm each. In another embodiment, the locking member 230 has a thickness within the range of from about 2.0 mm to about 5.0 mm. It will be understood however, that the locking member 230 may have any other desired thickness, such as for example a thickness smaller than 2.0 mm or larger than 5.0 mm. It will be further understood that one skilled in the art will be able to determine the appropriate thickness of the locking member 230 through routine experimentation.

The locking member 230 has a first longitudinal side 278, a second longitudinal side 280. The locking member 230 further includes six first teeth 292 formed on the first longitudinal side 278. The teeth 292 define first and second slots 298 and 299, respectively, therebetween.

Two second teeth 294A and 294B and 394A and 394B are formed on the outboard ends of the second longitudinal side 280 of the upper and lower plates 232 and 234, respectively. The second teeth 294A and 294B and 394A and 394B have outboard edges 204 and 304, respectively. Four third teeth 296A-D and 396A-D are formed between the second teeth of the upper and lower plates 232 and 234, respectively. The third teeth 296A-D and 396A-D have side or outboard edges 210 and 310, respectively.

The seat adjustment apparatus 22' is structured and configured to reduce or eliminate free-play and operates in a similar manner as the seat adjustment apparatus 22. In operation, the locking member 230 may be moved from an unlocked position, as shown at 230' in FIG. 7, by actuation of the pin 32 such that the spring 36 urges the locking member 30 into the locked position (upwardly when viewing FIG. 7).

As the locking member 230 moves upwardly, an upper portion of the outboard edge 204 of the tooth 294A frictionally engages the angled side surface 73 of a tooth 72. The upper portion of the outboard edge 304 of the tooth 394B also frictionally engages the angled side surface 73 of a tooth 72. The extent of the maximum upward travel of the teeth 294A and 394B in the exemplary embodiment illustrated is indicated by the circles labeled 212 and 214, respectively. The angled side surface 73 causes the second tooth 294A of the upper plate 232 to move substantially horizontally in the direction of the arrow 206. The angled side surface 73 of the tooth 72 also causes the second tooth 394B of the lower plate 234 to move substantially horizontally in the direction of the arrow 208.

As the upper plate 232 moves horizontally (to the right when viewing FIG. 7), the outboard edge 210 of the third tooth 296B is urged into frictional engagement with a side surface 259 of the first opening 258C of the upper rail 26'. As the lower plate 234 moves horizontally (to the left when viewing FIG. 5), the outboard edge 310 of the third tooth 396C is also urged into frictional engagement with a side surface 259 of a first opening 258C of the upper rail 26'.

The combination of the contact between the locking member 230, the lower rail 24, and the upper rail 26' clinch the second inner wall 64 of the lower rail 24, the second inner wall 42 of the upper rail 26', and the locking member 230 together, thereby substantially eliminating free-play.

The principle and mode of operation of the longitudinal adjustment apparatus for a vehicle seat have been described in its preferred embodiment. However, it should be noted that the longitudinal adjustment apparatus described herein may be practiced otherwise than as specifically illustrated and described without departing from its scope.

What is claimed is:

1. A longitudinal adjustment apparatus for a seat comprising:
   a first rail adapted to be secured to a support surface and having a plurality of openings defined by spaced-apart lock portions;
   a second rail adapted to be secured to a seat and having a plurality of openings defined by spaced-apart lock portions, wherein the first and second rails are supported for movement in a longitudinal direction relative to one another; and
   a locking member having first and second portions that each include a plurality of teeth, the locking member being movable between a locked position,
   wherein the teeth of both the first and second portions extend through the openings of both the first rail and the second rail into engagement with the spaced-apart lock portions of both the first rail and the second rail to prevent relative movement of the first and second rails in the longitudinal direction, and an unlocked position, wherein the teeth of both the first and second portions do not extend through the openings of both the first rail and the second rail into engagement with the spaced-apart lock portions of both the first rail and the second rail to allow relative movement of the first and second rails in the longitudinal direction, and
   wherein movement of the locking member between the locked and unlocked positions causes relative movement of the first and second portions in the longitudinal direction.

2. The longitudinal adjustment apparatus defined in claim 1 wherein as the locking member is moved from the unlocked position to the locked position, one of the teeth of the first portion engages a first one of the lock portions of the first rail and one of the teeth of the second portion engages a second one of the lock portions of the first rail to cause the relative movement of the first and second portions in the longitudinal direction.

3. The longitudinal adjustment apparatus defined in claim 2 wherein the relative movement of the first and second portions in the longitudinal direction causes the one of the teeth of the first portion to also engage a lock portion of the second rail, and further causes the one of the teeth of the second portion to also engage a lock portion of the second rail.

4. The longitudinal adjustment apparatus defined in claim 2 wherein the relative movement of the first and second portions in the longitudinal direction causes a second one of the teeth of the first portion to engage a lock portion of the second rail, and further causes a second one of the teeth of the second portion to engage a lock portion of the second rail.

5. The longitudinal adjustment apparatus defined in claim 2 wherein the lock portions of one of the first and second rails are tapered.

6. The longitudinal adjustment apparatus defined in claim 2 wherein the lock portions of both of the first and second rails are tapered.

7. The longitudinal adjustment apparatus defined in claim 1 wherein the movement of the locking member between the locked and unlocked positions is generally perpendicular to longitudinal direction.

8. The longitudinal adjustment apparatus defined in claim 1 wherein each of the first and second portions is a generally planar plate.

9. The longitudinal adjustment apparatus defined in claim 1 wherein the teeth of each of the first and second portions are a first width and are separated by spaces that are a second width that is different from the first width.

10. The longitudinal adjustment apparatus defined in claim 1 wherein the teeth of the first portion are a first width and the teeth of the second portion are a second width that is different from the first width.

11. A seat assembly comprising:
    a seat having a seat back and a seat bottom;
    a longitudinal adjustment apparatus including:
    a first rail adapted to be secured to a support surface and having a plurality of openings defined by spaced-apart lock portions;

a second rail secured to the seat bottom of the seat and having a plurality of openings defined by spaced-apart lock portions, wherein the first and second rails are supported for movement in a longitudinal direction relative to one another; and a locking member having first and second portions that each include a plurality of teeth, the locking member being movable between a locked position, wherein the teeth of both the first and second portions extend through the openings of both the first rail and the second rail into engagement with the spaced-apart lock portions of both the first rail and the second rail to prevent relative movement of the first and second rails in the longitudinal direction, and an unlocked position, wherein the teeth of both the first and second portions do not extend through the openings of both the first rail and the second rail into engagement with the spaced-apart lock portions of both the first rail and the second rail to allow relative movement of the first and second rails in the longitudinal direction, and wherein movement of the locking member between the locked and unlocked positions causes relative movement of the first and second portions in the longitudinal direction.

12. The seat assembly defined in claim 11 wherein as the locking member is moved from the unlocked position to the locked position, one of the teeth of the first portion engages a first one of the lock portions of the first rail and one of the teeth of the second portion engages a second one of the lock portions of the first rail to cause the relative movement of the first and second portions in the longitudinal direction.

13. The seat assembly defined in claim 12 wherein the relative movement of the first and second portions in the longitudinal direction causes the one of the teeth of the first portion to also engage a lock portion of the second rail, and further causes the one of the teeth of the second portion to also engage a lock portion of the second rail.

14. The seat assembly defined in claim 12 wherein the relative movement of the first and second portions in the longitudinal direction causes a second one of the teeth of the first portion to engage a lock portion of the second rail, and further causes a second one of the teeth of the second portion to engage a lock portion of the second rail.

15. The seat assembly defined in claim 12 wherein the lock portions of one of the first and second rails are tapered.

16. The seat assembly defined in claim 12 wherein the lock portions of both of the first and second rails are tapered.

17. The seat assembly defined in claim 11 wherein the movement of the locking member between the locked and unlocked positions is generally perpendicular to longitudinal direction.

18. The seat assembly defined in claim 11 wherein each of the first and second portions is a generally planar plate.

19. The seat assembly defined in claim 11 wherein the teeth of each of the first and second portions are a first width and are separated by spaces that are a second width that is different from the first width.

20. The seat assembly defined in claim 11 wherein the teeth of the first portion are a first width and the teeth of the second portion are a second width that is different from the first width.

* * * * *